United States Patent
Marin et al.

(10) Patent No.: US 10,394,052 B2
(45) Date of Patent: Aug. 27, 2019

(54) METHOD FOR DETERMINING A PAIR OF OPHTHALMIC LENSES

(71) Applicant: Essilor International, Charenton-le-Pont (FR)

(72) Inventors: Gildas Marin, Charenton-le-Pont (FR); Cecile Petignaud, Charenton-le-Pont (FR); Martha Hernandez-Castaneda, Charenton-le-Pont (FR); Laurent Calixte, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/556,899

(22) PCT Filed: Mar. 8, 2016

(86) PCT No.: PCT/EP2016/054851
§ 371 (c)(1),
(2) Date: Sep. 8, 2017

(87) PCT Pub. No.: WO2016/142363
PCT Pub. Date: Sep. 15, 2016

(65) Prior Publication Data
US 2018/0107020 A1    Apr. 19, 2018

(30) Foreign Application Priority Data
Mar. 10, 2015   (EP) .................................... 15305362

(51) Int. Cl.
*G02C 7/02*   (2006.01)
*G02C 7/06*   (2006.01)

(52) U.S. Cl.
CPC .............. *G02C 7/027* (2013.01); *G02C 7/02* (2013.01); *G02C 7/028* (2013.01); *G02C 7/061* (2013.01); *G02C 2202/22* (2013.01)

(58) Field of Classification Search
CPC .......... G02C 7/02; G02C 7/024; G02C 7/027; G02C 7/028; G02C 7/04
USPC ........................ 351/159.01, 159.02, 159.08, 351/159.73–159.77
See application file for complete search history.

(56) References Cited

U.S. PATENT DOCUMENTS

| | | | |
|---|---|---|---|
| 2010/0198515 A1 | 8/2010 | Becken et al. | |
| 2013/0329186 A1 | 12/2013 | Contet et al. | |
| 2015/0219924 A1 | 8/2015 | Moine et al. | |
| 2015/0378173 A1* | 12/2015 | Contet ................... | G02C 7/027 351/159.42 |

FOREIGN PATENT DOCUMENTS

| | | |
|---|---|---|
| DE | 102005057533 A1 | 6/2007 |
| DE | 102007015908 A1 | 10/2008 |
| EP | 2490065 A1 | 8/2012 |
| WO | 2014/037482 A2 | 3/2014 |

OTHER PUBLICATIONS

International Search Report and Written Opinion dated Jun. 10, 2016, in PCT/EP2016/054851, filed Mar. 8, 2016.

* cited by examiner

*Primary Examiner* — Darryl J Collins
(74) *Attorney, Agent, or Firm* — Oblon, McClelland, Maier & Neustadt, L.L.P.

(57) ABSTRACT

A method for determining a pair of ophthalmic lenses adapted to a wearer, the method including: a wearer data providing, during which wearer data including at least an indication of the distortion dominant eye of the wearer and an indication of the prescription of the wearer are provided; an ophthalmic lenses determining, during which a pair of ophthalmic lenses adapted to the wearer is determined based at least on the wearer data.

12 Claims, 3 Drawing Sheets

METHOD FOR DETERMINING A PAIR OF OPHTHALMIC LENSES

FIELD OF THE INVENTION

The invention relates to a method, implemented by computer means, for determining a pair of ophthalmic lenses adapted to a wearer, to a computer program product and to a pair of ophthalmic lenses adapted for a wearer.

BACKGROUND OF THE INVENTION

Ophthalmic equipment, such as a pair of ophthalmic lenses generally generates optical distortion. The perception of the optical distortion generated by a pair of ophthalmic lenses varies depending on the type of ophthalmic lenses. The perception of the optical distortion also greatly depends on the wearer himself.

When trying to reduce the optical distortions perceived by a wearer through an ophthalmic equipment, one should consider this inter-individual variability, relying for example on physiological criteria, biometric or vision behavior.

Lens designers propose optical designs that try to reduce the perception of optical distortion by the wearer.

For example, the lens design may be determined so that the distribution of optical aberration on the ophthalmic lens allows reducing the gradients of power and astigmatism (commonly referred to as "soft design") so as to reduce the optical distortion generated by the ophthalmic lens. No parameters in addition to the wearer's prescription are taken into account and the same solution is applied to all wearers.

Some lens designs take into account wearer parameters so as to reduce the perception by the wearer of the optical distortion generated by the ophthalmic lenses. For example, the tendency of the wearer to move his eyes or his head when gazing at a moving target may be taken into account when designing an ophthalmic lenses so as to try to minimize the perception by the wearer of the optical distortion generated by the ophthalmic lenses.

All current solutions to determine lens designs that reduce the perception of the optical distortion attempt to reduce the perception of the optical distortion indiscriminately for both ophthalmic lenses of the pair of ophthalmic lenses.

Aiming at having the lowest level of optical distortions for each eye of the wearer generates major design constraints and therefore the degrees of freedom to further improve the design of the ophthalmic lenses, such as the optical overall performance or the aesthetics, are low.

One object of the present invention is to provide a method for determining a pair of ophthalmic lenses that allows both providing to a wearer a low level of perceived optical distortion and maintaining a high degree of freedom to further improving the overall performance of the pair of ophthalmic lenses.

SUMMARY OF THE INVENTION

To this end, the invention proposes a method, for example implemented by computer means, for determining a pair of ophthalmic lenses adapted to a wearer, the method comprising:
  a wearer data providing step, during which wearer data comprising at least an indication of the distortion dominant eye of the wearer and an indication of the prescription of the wearer are provided,
  an ophthalmic lenses determining step, during which a pair of ophthalmic lenses adapted to the wearer is determined based at least on the wearer data.

Advantageously, during the ophthalmic lenses determining step both the prescription of the wearer and an indication of the distortion dominant eye of the wearer are considered when determining the pair of ophthalmic lenses. Providing information indicative of the distortion dominant eye of the wearer and basing the determination of the pair of ophthalmic lenses on such indication allows adjusting the level of optical distortion between both eyes of the wearer. Typically, a wearer may perceive through a first eye a distortion level objectively smaller than the minimum distortion level that he may perceive through his second eye. In this case, the distortion sensibility of the second eye is lower the distortion sensibility of the first eye, providing a greater degree of freedom to further improve other parameters of the ophthalmic lens, such as optical or geometrical parameters.

According to further embodiments which can be considered alone or in combination:
  said ophthalmic lenses determining step is carried out so that the optical distortion of the first ophthalmic lens to be used by the distortion dominant eye of the wearer and/or the optical distortion of the second ophthalmic lens to be used by the other eye is optimized; and/or
  during ophthalmic lenses determining step the ophthalmic lenses of the pair of ophthalmic lenses are determined so that the optical distortion of the first ophthalmic lens to be used by the distortion dominant eye of the wearer is smaller than the distortion of the second ophthalmic lens to be used by the other eye, wherein a difference $|P1_{FV} - P2_{FV}|$ of optical power $P1_{FV}$, $P2_{FV}$ at a far vision point of the first and second ophthalmic lens is smaller than or equal to 0.75 diopter; and/or
  the ophthalmic lenses determining step further comprises a optical design selecting step during which for at least one the ophthalmic lens an optical design is selected in a list consisting of at least two optical design, the optical design being selected based at least on the wearer data; and/or
  the ophthalmic lenses determining step further comprises a geometry determining step during which for each of the ophthalmic lens geometrical parameter are determined, the geometrical parameters being determined based at least on the wearer data; and/or
  the ophthalmic lenses determining step further comprises an addition determining step during which for each of the ophthalmic lens an addition is determined, the addition being determined based at least on the wearer data and so that the addition of the first ophthalmic lens is smaller than the addition of the second ophthalmic lens; and/or
  the ophthalmic lenses determining step further comprises a first ophthalmic lens determining step, during which the first ophthalmic lens is determined based on the wearer data and so as to minimize the optical distortion of said first ophthalmic lens; and/or
  the ophthalmic lenses determining step further comprises a second ophthalmic lens determining step, during which the second ophthalmic lens is determined based on the wearer data and so as to minimize the geometrical parameters differences between the first and second ophthalmic lenses; and/or
  the ophthalmic lenses determining step further comprises:

a set of parameters providing step, during which a set of parameters of the ophthalmic lenses is provided, the set of parameter comprising at least the optical distortion, a set of cost functions providing step during which for each parameter of the set of parameter a cost function is provided, a first ophthalmic lens determining step, during which the first ophthalmic lens is determined so as to minimize the difference between a first global cost function and a first target value, the first global cost function being a weighted sum of the cost functions, a second ophthalmic lens determining step, during which the second ophthalmic lens is determined so as to minimize the difference between a second global cost function and a second target value, the first global cost function being a weighted sum of the cost functions, wherein the relative weight of the optical distortion cost function in the first global cost function is greater than the relative weight of the optical distortion cost function in the second global cost function; and/or the ophthalmic lenses determining step further comprises:

a first ophthalmic lens determining step, during which the first ophthalmic lens of the wearer is determined based on the wearer data and so as to minimize the optical distortion of said ophthalmic lens, a second ophthalmic lens determining step, during which the second ophthalmic lens is determined based on the wearer data and so as to minimize the difference of optical distortion with the first ophthalmic lens; and/or the distortion dominant eye of the wearer is chosen in the list consisting of: the sighting eye, the dominant eye, the prevalent eye and the eye of greatest acuity.

The invention also relates to a pair of ophthalmic lenses adapted for a wearer, wherein the absolute value of the difference of the normalized distortion between the first and second ophthalmic lenses is greater than 20, wherein a difference $|P1_{FV}-P2_{FV}|$ of optical power $P1_{FV}$, $P2_{FV}$ at a far vision point of each lens of said pair of lenses is smaller than or equal to 0.75 diopter or the product $P1_{FV} \cdot P2_{FV}$ is positive.

The invention further relates to a computer program product comprising one or more stored sequences of instructions that are accessible to a processor and which, when executed by the processor, causes the processor to carry out the steps of the methods according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Figure 1:
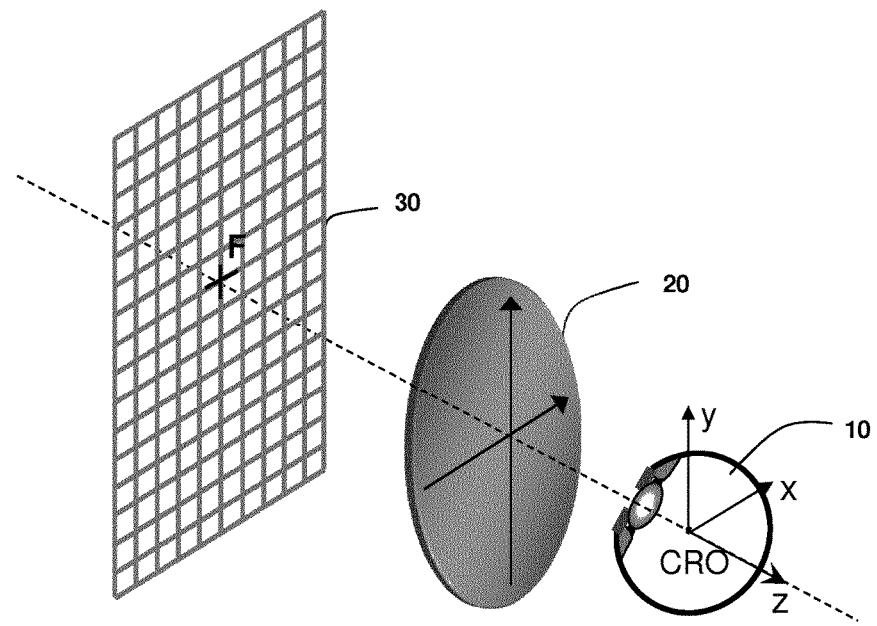
FIG. 1 is a schematic representation of a system comprising an eye of a wearer, an ophthalmic lens and an object vertical plane.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

The inventors have carry out tests using virtual reality simulator to observe and quantify the perception of optical distortions by wearers when wearing a pair of progressive ophthalmic lenses having different addition for the right eye and the left eye.

The results of these tests show that when having different additions on both eyes, wearers perceive more optical distortion through the ophthalmic equipment when the highest addition is carried by the ophthalmic lens in front of the distortion dominant eye of the wearer and perceive less optical distortion when the lowest addition is carried by the ophthalmic lens in front of the non distortion dominant eye of the wearer. In the sense of the invention, the distortion dominant eye is defined as the eye with the higher distortion sensibility, providing a higher optical distortion perception than the other eye.

Moreover, the inventors have observed that the optical distortions perceived through these pair of ophthalmic lenses are close to the optical distortions generated by ophthalmic lenses corresponding to the one placed in front of the distortion dominant eye of the wearer.

For example, when a wearer has a pair of ophthalmic lenses with an addition of 2.5 D before his distortion dominant eye and an addition of 2.0 D before the other eye, he perceives an optical distortion close to the one he perceives with a pair of ophthalmic lenses having both an addition of 2.5 D.

On the other hand when a wearer has a pair of ophthalmic lenses with an addition of 2.0 D before his distortion dominant eye and an addition of 2.5 D before the other eye, he perceives an optical distortion close to the one he perceives with a pair of ophthalmic lenses having both an addition of 2.0 D.

It has been observed that the optical distortion is perceived greater by the wearer with a pair of ophthalmic lenses having an addition of 2.5 D for both lenses than for a pair of ophthalmic lenses having an addition of 2.0 D for both lenses.

Finally, the inventors have observed that the level of optical distortion perceived by a wearer through an ophthalmic equipment is closer to the level of optical distortion generated by the ophthalmic lens in front of the distortion dominant eye of the wearer.

The principal of the invention is therefore to consider the distortion dominant eye of a wearer when determining an ophthalmic equipment adapted to said wearer, so as to change the perception of optical distortions by the wearer.

The method according to the invention proposes to differentiate the way distortion is managed on the two eyes of the wearer, especially favoring low distortion over the distortion dominant eye of the wearer while for the ophthalmic lens intended to be worn in front of the other eye the distortions constraints may be released to allow the benefit of additional degree of freedom in the design of this lens.

In the sense of the invention, "optical distortion of an ophthalmic lens" refers to an optical aberration that results in straight lines being images as curved when seen through the ophthalmic lens.

Different parameters may be used to quantify optical distortion of an ophthalmic lens, among which the deformation of a horizontal line seen through the ophthalmic lens.

Such distortion parameter may be determined considering the system illustrated on FIG. 1.

One considers a system comprising an eye 10 rotating about its center of rotation (ERC) and an ophthalmic lens 20 placed before the eye 10.

The ophthalmic lens 20 is positioned according to wearing conditions.

The wearing conditions are to be understood as the position of the ophthalmic lens with relation to the eye of a wearer, for example defined by a pantoscopic angle, a Cornea to lens distance, a Pupil-cornea distance, a ERC to pupil distance, a ERC to lens distance and a wrap angle.

The Cornea to lens distance is the distance along the visual axis of the eye in the primary position (usually taken to be the horizontal) between the cornea and the back surface of the lens; for example equal to 12 mm.

The Pupil to cornea distance is the distance between its pupil and cornea; usually equal to 2 mm.

The ERC to pupil distance is the distance along the visual axis of the eye between the Eye Center of Rotation (ERC) and the cornea; for example equal to 11.5 mm.

The ERC to lens distance is the distance along the visual axis of the eye in the primary position (usually taken to be the horizontal) between the ERC and the back surface of the lens, for example equal to 25.5 mm.

The Pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 5°.

For determining the optical distortion the inventors have considered specific wearing condition defined by a pantoscopic angle of −8°, a Cornea to lens distance of 12 mm, a Pupil-cornea distance of 2 mm, an ERC to pupil distance of 11.5 mm, a ERC to lens distance of 25.5 mm and a wrap angle of 0°.

The ophthalmic lens is considered as having a rectangular shape corresponding approximately to the shape of a frame of 54 mm of length and 38 mm of height, with a bridge distance of 16 mm for a mounting height of 22 mm and a half pupil distance of 32.5 mm.

A vertical object plane is considered at 1 meter from the front surface of the ophthalmic lens.

A fixation point F in the vertical object plane is defined as being the intersection of the visual axis of the eye in the primary position (z) with the vertical object plan.

In the vertical object plane a horizontal line 30 is built (parallel to the x axis) seen through the bottom of the ophthalmic lens. For this, one considers the vertical power at the near vision point given by the prescription power at the far vision point and the prescribed addition, and the horizontal line is positioned along the y axis with the approximation of Prentice:

$$D = P*d/10$$

Where D is the prismatic deviation in prism diopters, P is the power of the lens in diopters, d is the distance to the center of the lens in mm. In the present case d is set equal to 22 mm.

Once the horizontal line positioned in the vertical object plane, said horizontal line is sampled in a number of points regularly spaced. The image of the horizontal line 30 through the ophthalmic lens 20 is calculated using the image of each of the sampled points through the lens obtained by ray tracing and projected in the vertical object plane.

Figure 2:
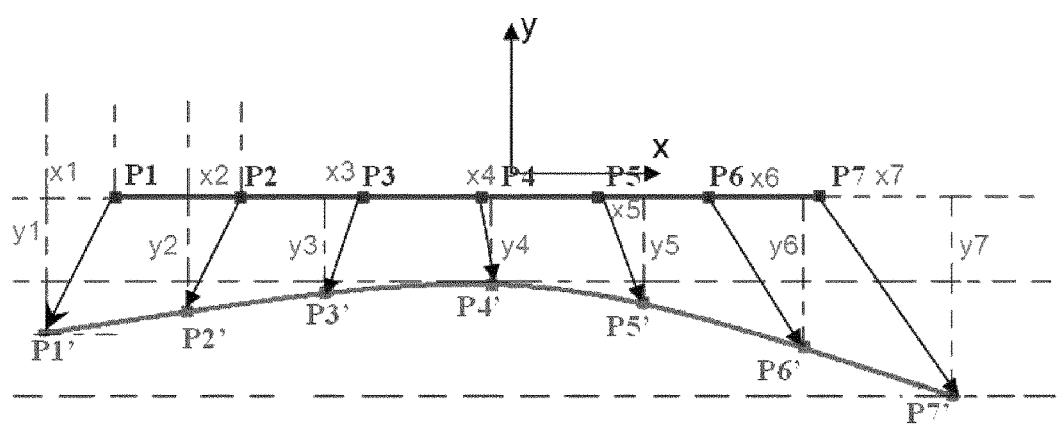
FIG. 2 is a schematic representation of the deformation of a line through an ophthalmic lens.

A curve image line 40 of the object line 42 is then obtained as shown on FIG. 2. Each reference y1, y2, . . . yn respectively represents the vertical movement of a point P1, P2, . . . Pn of the horizontal line 30 through the ophthalmic lens 20 relative to the center of the coordinate system (x, y).

Finally, deformation of a horizontal line can be calculated as being the average (y1, y2, . . . yn) which represents the average movement of the horizontal line 30 through the ophthalmic lens 20. The deformation of the horizontal line is representative of the deformation of objects seen through the ophthalmic lens.

For each optical design, the deformation of the horizontal line depends on the sphere, the cylinder and the addition of the ophthalmic lens. A consequence of the invention is that two ophthalmic lenses calculated for the same prescription and having the same optical design may have different distortion levels.

For ophthalmic lenses with different designs and identical requirements, distortions are naturally different.

However, the invention implies that the differences of optical distortion between the distortion dominant eye and the non-distortion dominant eye are greater than the differences of optical distortion related only to the differences between the two prescriptions. This is why the inventors have proposed a normalized distortion criterion in relation to the prescription, so called normalized distortion. The normalized distortion represents a distortion which is independent from the optical design of the ophthalmic lens. More precisely, for all optical designs, the normalized distortion is a function of the sphere and the addition of the ophthalmic lens. The deformation of the horizontal line depends on the sphere and the addition of the ophthalmic lens for all different optical designs.

For each eye of the wearer the normalized distortion is determined as being equation to the average (y1, y2, . . . yn)+160*Sph+66*Add with Sph being the mean sphere at the far distance point of the ophthalmic lens and Add being the addition of the ophthalmic lens.

The mean sphere Sph at any point of the ophthalmic lens, and for instance at far distance point of the ophthalmic lens, may be defined by the formula:

$$Sph = \frac{1}{2}(Sph_{min} + Sph_{max})$$

where $Sph_{min}$ and $Sph_{max}$ are respectively the minimum and maximum spheres.

When the surface considered is the vertical object plane surface, also referred to as the front surface, the expressions are the following:

$$Sph_{min} = (n-1) * CURV_{min} = \frac{n-1}{R_{max}}, \text{ and}$$

$$Sph_{max} = (n-1) * CURV_{max} = \frac{n-1}{R_{min}}$$

where n is the index of the constituent material of the lens, where $CURV_{min}$ and $CURV_{max}$ are respectively the minimum and maximum curvature at any point on an aspherical surface, expressed in diopters, and where $R_{min}$ and $R_{max}$ are respectively the local minimum and maximum radius of curvature, expressed in meters.

If the surface considered is an eyeball side surface, also referred to as the back surface, the expressions are the following:

$$Sph_{min} = (1-n) * CURV_{min} = \frac{1-n}{R_{max}}, \text{ and}$$

$$Sph_{max} = (1-n) * CURV_{max} = \frac{1-n}{R_{min}}$$

where n is the index of the constituent material of the lens.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

The expression of the mean sphere therefore depends on the surface considered:

if the surface is the vertical object plane surface:

$$Sph = \frac{n-1}{2}\left(\frac{1}{R_{min}} + \frac{1}{R_{max}}\right)$$

if the surface is an eyeball side surface:

$$Sph = \frac{1-n}{2}\left(\frac{1}{R_{min}} + \frac{1}{R_{max}}\right)$$

A cylinder CYL is also defined by the formula $CYL = |Sph_{max} - Sph_{min}|$.

The characteristics of any aspherical face of the lens may be expressed by the local mean spheres and cylinders. A surface can be considered as locally aspherical when the cylinder is greater than 0.25 diopters.

The invention relates to a pair of ophthalmic lenses adapted for a wearer, wherein the absolute value of the difference of the normalized distortion between the first and second ophthalmic lenses is greater than 20 and wherein a difference |P1FV−P2FV| of optical power P1FV, P2FV at a far vision point of each lens of said pair of lenses is smaller than or equal to 0.75 diopter or the product P1FV*P2FV is positive where |x| denotes absolute value of x.

Figure 3:
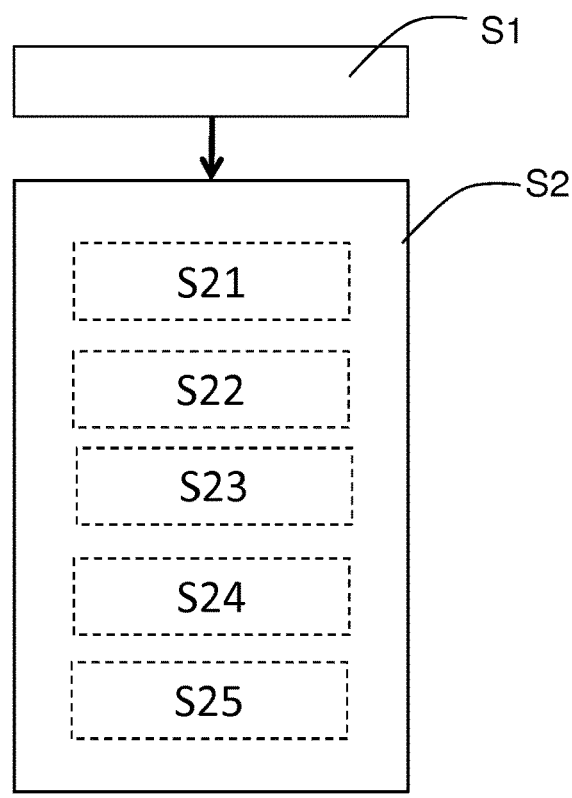
FIGS. 3 to 5 are flowchart representing the steps of methods according to different embodiments of the invention.

As represented on FIG. 3, the invention further relates to a method for determining a pair of ophthalmic lenses adapted to a wearer, the method comprises:

a wearer data providing step S1, and
an ophthalmic lens determining step S2.

During the wearer data providing step S1, wearer data comprising at least an indication of the distortion dominant eye of the wearer and an indication of the prescription of the wearer are provided.

The prescription is a set of optical characteristics consisting of optical power, astigmatism (value and axis) and, where relevant, addition, determined by an ophthalmologist in order to correct the vision defects of an individual, for example by means of a lens positioned in front of his eye. Generally speaking, the prescription for a progressive addition lens comprises values of optical power and of astigmatism at the distance-vision point and, where appropriate, an addition value.

The distortion dominant eye may be determined by implementing a distortion sensitivity test.

The sensitivity test may consist, for example, in a digital simulation of the actual distortion of lens, using images showing a deformed scene or grid (for example single vision or progressive additional lenses). An image is provided to each eye with distortion levels that differ. The image having the highest level of distortion is first placed in front of a first eye and then in front of a second eye. If the wearer prefers the first configuration that means that the second eye is the distortion dominant eye.

The sensitivity test can be carried out in central vision and/or peripheral vision and/or static vision and/or dynamic vision.

Otherwise, the distortion dominant eye is chosen in the list consisting of the sighting eye, the dominant eye, the prevalent eye and the eye of greatest acuity.

During the ophthalmic lens determining step S2, a pair of ophthalmic lenses adapted to the wearer is determined based at least on the wearer data, i.e. at least on the indication of the distortion dominant eye and the prescription of the wearer.

Typically, the ophthalmic lenses determining step is carried out so that the optical distortion of the first ophthalmic lens to be used by the distortion dominant eye of the wearer and/or the optical distortion of the second ophthalmic lens to be used by the other eye is optimized.

The optimization of the distortion of the pair of ophthalmic lenses with a difference |P1FV−P2FV| of optical power P1FV, P2FV at a far vision point of the first and second ophthalmic lens is smaller than or equal to 0.75 diopter may comprise determining the ophthalmic lenses so that the optical distortion of the first ophthalmic lens to be used by the distortion dominant eye of the wearer is smaller than the distortion of the second ophthalmic lens to be used by the other eye.

As indicated previously, since the optical distortion perception is mostly provided by the distortion dominant eye, the optimized pair of ophthalmic lens determined according to the invention generates less optical distortion perception than prior art ophthalmic lenses.

As represented on FIG. 3, the ophthalmic lenses determining step S2 may further comprise an optical design selecting step S21. During the optical design selecting step S21 for each of the ophthalmic lens an optical design is selected in a list consisting of at least two optical design, the optical design being selected based at least on the wearer data.

For example, if for at least one eye, there is a choice of different optical designs, such as different distribution of aberrations in terms of viewing directions, such as different field size in the near vision zone or far vision zone, one can choose for the distortion dominant eye the design that minimize the optical distortion and a other optical design for the other eye.

For example, if for at least one eye, there is a choice of different optical designs, such as different distribution of aberrations in terms of viewing directions, such as different field size in the near vision zone or far vision zone, one can choose for the non-distortion dominant eye a design with increase distortion. Advantageously, a further parameter of the optical design may be optimized so as to improve visual comfort of the wearer without increasing the effect of optical distortion for the wearer.

In other words, among a larger number of designs available for each ophthalmic prescription the distortion dominant eye is to be used as a choice criteria, eventually in combination with other criteria such as sensitivity to blur.

As represented on FIG. 3, the ophthalmic lenses determining step S2 may further comprise an optical geometry determining step S22 during which for each of the ophthalmic lens geometrical parameter are determined, the geometrical parameters being determined based at least on the wearer data.

Typically, in cases of different geometries for the ophthalmic lenses for each eye, each geometry providing advantages other than reduced distortion, the distortion dominant eye may be used alone or in combination with other parameters, to select the most adapted geometry, i.e. that does not penalize the distortion dominant eye in terms of perception of optical distortion.

For example, the lens designer may consider the following geometry:

Geometry 1: very thick, with little distortion
Geometry 3: fine, with many distortions
Geometry 2: Intermediate between Geometry 1 and Geometry 3

Having an indication of the distortion dominant eye, the lens designer may choose to have the Geometry 1 for the distortion dominant eye and Geometry 2 or 3 for the other eye.

For example, it is possible to use, for a negative power lens for which edge thickness is to be controlled, Geometry 1 lens which is standard curved and bent progressive multifocal lens of negative prescription, providing minimum aberration over the field of view and Geometry 3 lens which is a specific curved and bent progressive multifocal lens of negative prescription. Both lenses are described in FIGS. 19-26 and relative description sections of U.S. Pat. No. 8,007,102 B2.

When the prescription for two eyes of a wearer are different, semi-finished optical lenses used having different front surfaces curvatures are to be used for manufacturing the lenses adapted to said wearer. For aesthetic consideration the one prefers to use two identical semi-finished optical lenses. The choice between the different semi-finished optical lenses is usually done by selecting the semi-finished optical lens having the flattest front surface.

The method according to the invention may be used to select semi-finished optical lenses by selecting the semi-finished optical lens that minimizes the effect of distortion for the distortion dominant eye of the wearer. In certain case, the selected the semi-finished optical lens does not correspond to the semi-finished optical lens having the flattest front surface.

As represented on FIG. 3, the ophthalmic lenses determining step S2 may further comprise an addition determining step S23 during which for each of the ophthalmic lens an addition is determined, the addition being determined based at least on the wearer data and so that the addition of the first ophthalmic lens is smaller than the addition of the second ophthalmic lens.

Typically, when considering lenses of identical design but for which the addition prescription is different, for example the near vision is favored for one eye and the far vision is favored for the other eye, the determining of the pair of ophthalmic lenses is based on the idea of having the smallest addition for the ophthalmic lenses to be used by the distortion dominant eye.

As represented on FIG. 3, the ophthalmic lenses determining step may further comprise a first ophthalmic lens determining step S24, during which the first ophthalmic lens is determined based on the wearer data and so as to minimize the optical distortion of said first ophthalmic lens.

The ophthalmic lenses determining step may further comprises a second ophthalmic lens determining step S25, during which the second ophthalmic lens is determined based on the wearer data and so as to minimize the geometrical parameters differences between the first and second ophthalmic lenses.

Advantageously, the weight and/or shape and/or volume balance between both ophthalmic lenses is optimized together with the perception of the optical distortion.

According to a further embodiment of the invention, during first ophthalmic lens determining step S24, the front and rear surfaces of the first ophthalmic lens are determined based on the wearer data and so as to minimize the optical distortion of said first ophthalmic lens corresponding to the distortion dominant eye. The front surface may be aspherical.

During the second ophthalmic lens determining step S25 the front surface of the first surface of the ophthalmic lens is used as front surface of the second ophthalmic lens and the rear surface of the second ophthalmic lens is determined based on the wearer data.

As an alternative, during the second ophthalmic lens determining step S25 the second ophthalmic lens can be determined using a binocular optimization method based on the wearer data and so as to minimize the binocular disparity of distortion between the first and the second ophthalmic lenses. In this case, the front surface of the second ophthalmic lens may differ from the front surface of the first ophthalmic lens.

The first and second ophthalmic lenses may then by manufactured using a digital surfacing method.

Figure 4:
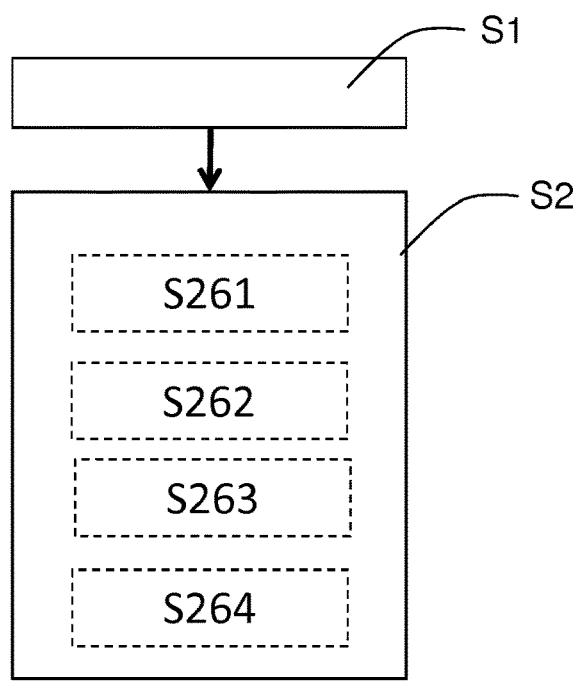

As represented on FIG. 4, the ophthalmic lenses determining step may comprises an optimization process. For example the further ophthalmic lenses determining step comprises:

a set of parameters providing step S261, during which a set of parameters of the ophthalmic lenses is provided, the set of parameter comprising at least the optical distortion, a set of cost functions providing step S262, during which for each parameter of the set of parameter a cost function is provided, a first ophthalmic lens determining step S263, during which the first ophthalmic lens is determined so as to minimize the difference between a first global cost function and a first target value, the first global cost function being a weighted sum of the cost functions, a second ophthalmic lens determining step S264, during which the second ophthalmic lens is determined so as to minimize the difference between a second global cost function and a second target value, the first global cost function being a weighted sum of the cost functions, wherein the relative weight of the optical distortion cost function in the first global cost function is greater than the relative weight of the optical distortion cost function in the second global cost function.

In other words, when determining the first and second ophthalmic lenses of the pair of ophthalmic lens the optical distortion is considered with greater importance when optimizing the ophthalmic lens to be used by the distortion dominant eye.

Figure 5:
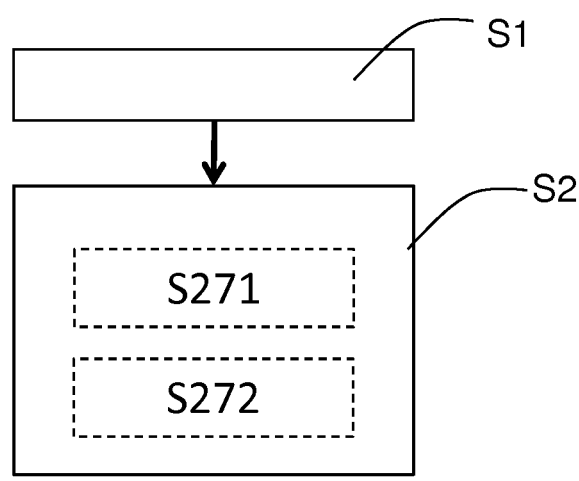

As represented on FIG. 5, the ophthalmic lenses determining step may further comprise:

a first ophthalmic lens determining step S271, during which the first ophthalmic lens of the wearer is determined based on the wearer data and so as to minimize the optical distortion of said ophthalmic lens, a second ophthalmic lens determining step S272, during which the second ophthalmic lens is determined based on the wearer data and so as to minimize the difference of optical distortion with the first ophthalmic lens.

Advantageously, the optical distortion is minimized on the ophthalmic lens to be used by the distortion dominant eye ensuring low distortion perception by the wearer, and disparities are also minimized through the other ophthalmic lens further increasing the binocular performance in perceived distortion across the full equipment.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

The invention claimed is:

1. A method for determining a pair of ophthalmic lenses adapted to a wearer, the method comprising:
a wearer data providing step, during which wearer data comprising at least an indication of distortion dominant eye of the wearer and an indication of prescription of the wearer are provided, the distortion dominant eye being the eye with higher distortion sensibility;
an ophthalmic lenses determining step, during which a pair of ophthalmic lenses adapted to the wearer is determined based at least on the wearer data,
wherein during the ophthalmic lenses determining step the ophthalmic lenses of the pair of ophthalmic lenses are determined so that the optical distortion of a first ophthalmic lens to be used by the distortion dominant eye of the wearer is smaller than the distortion of a second ophthalmic lens to be used by the other eye, wherein a difference $|P1_{FV}-P2_{FV}|$ of optical power $P1_{FV}$, $P2_{FV}$ at a far vision point of the first and second ophthalmic lens is smaller than or equal to 0.75 diopter.

2. The method according to claim 1, wherein the ophthalmic lenses determining step is carried out so that the optical distortion of the first ophthalmic lens to be used by the distortion dominant eye of the wearer and/or the optical distortion of the second ophthalmic lens to be used by the other eye is optimized.

3. The method according to claim 1, wherein the ophthalmic lenses determining step further comprises an optical design selecting step during which for at least one of the ophthalmic lens an optical design is selected in a list of at least two optical designs, the optical design being selected based at least on the wearer data.

4. The method according to claim 1, wherein the ophthalmic lenses determining step further comprises an optical geometry determining step during which for each of the ophthalmic lens geometrical parameter are determined, the geometrical parameters being determined based at least on the wearer data.

5. The method according to claim 1, wherein the ophthalmic lenses determining step further comprises an addition determining step during which for each of the ophthalmic lens an addition is determined, the addition being determined based at least on the wearer data and so that the addition of the first ophthalmic lens is smaller than the addition of the second ophthalmic lens.

6. The method according to claim 1, wherein the ophthalmic lenses determining step further comprises a first ophthalmic lens determining step, during which the first ophthalmic lens is determined based on the wearer data and to minimize the optical distortion of the first ophthalmic lens.

7. The method according to claim 6, wherein the ophthalmic lenses determining step further comprises a second ophthalmic lens determining step, during which the second ophthalmic lens is determined based on the wearer data and to minimize geometrical parameter differences between the first and second ophthalmic lenses.

8. The method according to claim 1, wherein the ophthalmic lenses determining step further comprises:
- a set of parameters providing steps, during which a set of parameters of the ophthalmic lenses is provided, the set of parameter comprising at least the optical distortion;
- a set of cost functions providing steps during which for each parameter of the set of parameter a cost function is provided;
- a first ophthalmic lens determining step, during which the first ophthalmic lens is determined to minimize the difference between a first global cost function and a first target value, the first global cost function being a weighted sum of the cost functions; and
- a second ophthalmic lens determining step, during which the second ophthalmic lens is determined to minimize the difference between a second global cost function and a second target value, the first global cost function being a weighted sum of the cost functions,
- wherein the relative weight of the optical distortion cost function in the first global cost function is greater than the relative weight of the optical distortion cost function in the second global cost function.

9. The method according to claim 1, wherein the ophthalmic lenses determining step further comprises:
- a first ophthalmic lens determining step, during which the first ophthalmic lens of the wearer is determined based on the wearer data and to minimize the optical distortion of the ophthalmic lens;
- a second ophthalmic lens determining step, during which the second ophthalmic lens is determined based on the wearer data and so minimize the difference of optical distortion with the first ophthalmic lens.

10. The method according to claim 1, wherein the distortion dominant eye of the wearer is chosen from the list consisting of: a sighting eye, a dominant eye, a prevalent eye, and an eye of greatest acuity.

11. A non-transitory computer readable medium including a computer program product comprising one or more stored sequences of instructions that are accessible to a processor and which, when executed by the processor, causes the processor to carry out the method according to claim 1.

12. A pair of ophthalmic lenses adapted for a wearer, wherein the absolute value of the difference of normalized distortion between the first and second ophthalmic lenses is greater than 5, wherein a difference $|P1_{FV} - P2_{FV}|$ of optical power $P1_{FV}$, $P2_{FV}$ at a far vision point of each lens of said pair of lenses is smaller than or equal to 0.75 diopter or the product $P1_{FV} + P2_{FV}$ is positive.

* * * * *